United States Patent [19]

Wischer

[11] 4,276,568
[45] Jun. 30, 1981

[54] BOOSTING VIDEO SIGNALS

[75] Inventor: Hermann Wischer, Kiel, Fed. Rep. of Germany

[73] Assignee: Dr.-Ing Rudolf Hell GmbH, Kiel, Fed. Rep. of Germany

[21] Appl. No.: 65,442

[22] Filed: Aug. 10, 1979

[30] Foreign Application Priority Data

Aug. 25, 1978 [DE] Fed. Rep. of Germany ....... 2837139

[51] Int. Cl.³ .............................................. H04N 1/40
[52] U.S. Cl. ..................................... 358/282; 358/280
[58] Field of Search ........................ 358/280, 282, 284

[56] References Cited
U.S. PATENT DOCUMENTS

| 3,159,815 | 12/1964 | Groce | 358/282 |
| 3,952,144 | 4/1976 | Kolker | 358/282 |
| 4,084,196 | 4/1978 | Tisue | 358/280 |

Primary Examiner—Howard W. Britton
Attorney, Agent, or Firm—Brisebois & Kruger

[57] ABSTRACT

This invention relates to a method of boosting a discontinuous-value video signal (in pulse or stepped form). From the video signal there is derived an upper accompanying signal extending above it and a lower accompanying signal extending below it, which follow the video signal dynamically. First differential values are formed between the upper accompanying signal and the video signal and second differential values are formed between the video signal and the lower accompanying signal. To boost the discontinuous-value video signal, multiples of the first differential values are subtracted continuously from the video signal and multiples of the second differential values are added to the video signal.

10 Claims, 5 Drawing Figures

BOOSTING VIDEO SIGNALS

BACKGROUND OF THE INVENTION

The present invention relates to a method and a circuit arrangement for boosting the pulses of video signals, for example in monochrome facsimile reproduction.

In a facsimile scanning arrangement, an original which is to be copied is scanned point-by-point and line-by-line by a scanning device having one or more optoelectronic transducers and the brightness information of the original is converted into a video signal.

The original may be a printed document or a document in typescript, a handwritten text or a graphic representation.

The video signal obtained by scanning the original is converted into a two-level monochrome signal by comparison with a threshold signal and transmitted to a receiving apparatus on a transmission channel. The recording device of the receiving apparatus, which device is controlled by the monochrome signal, records a facsimile of the original.

Due to the limited resolving power of the scanning device, when thin strokes and lines are scanned and also in the case of originals with a low contrast, only small, falsified signal amplitudes are produced and these often do not reach the threshold signal and therefore also do not produce any change in the monochrome signal. In this way, for example, thin black strokes on a white background or thin white strokes on a black background are lost in the facsimile record.

To avoid such losses of information, it is known to subject the video signal to double differentiation for the purpose of boosting its amplitude before it is compared with the threshold signal. The boosted video signal now interesects the threshold signal and the monochrome signal contains all the information required for faultless transmission.

Double differentiation can be carried out meaningfully, however, only if the video signal has a continuous-value curve, as is the case for instance in the scanning of originals with a discrete optoelectronic transducer.

In order to increase the scanning speed, however, it is customary to scan the original with a number of optoelectronic transducers (line of photodiodes) at the same time.

Such a line of photodiodes supplies, for example, a stepped, discontinuous-value video signal which is not suitable for double differentiation.

In addition, when a line of photodiodes is employed, there is the fact that as a result of the optical imaging of the information in the original on the line of photodiodes and of interference by adjacent photodiodes in the line, a flattened video signal apppears and, consequently, a loss of detail. This loss of detail can be compensated by suitable pulse boosting.

It is therefore an object of the invention to provide a method of boosting pulses in the case especially of a discontinuous-value vidoe signal, by means of which the quality of recording is improved.

SUMMARY OF THE INVENTION

Accordingly, the invention consists in a method of boosting a video signal, which method consists in deriving from said video signal an upper accompanying signal extending above it and a lower accompanying signal extending below it, said accompanying signals following said video signal dynamically, forming first differential value continuously between said upper accompanying signal and said video signal, forming second differential values continuously between said video signal and said lower accompanying signal, subtracting multiples of said first differential values continuously from said video signal and adding multiples of said second differential values continuously to said video signal.

The invention also consists in an assembly for carrying out this method and comprising an arrangement for obtaining said video signal, a first generator to which said video signal can be applied and for generating said upper accompanying signal, a second generator to which said video signal can be applied and for generating said lower accompanying signal, and a combining stage connected to said generators and to said arrangement for obtaining the boosted video signal by combining said accompanying signals with said video signal.

BRIEF DESCRIPTION OF THE DRAWINGS

In order that the invention may be more clearly understood, reference will now be made to the accompanying drawings which show certain embodiments thereof and explanatory graphs by way of example and in which.

DETAILED DESCRIPTION OF PREFERRED EMBODIMENTS

Figure 1:
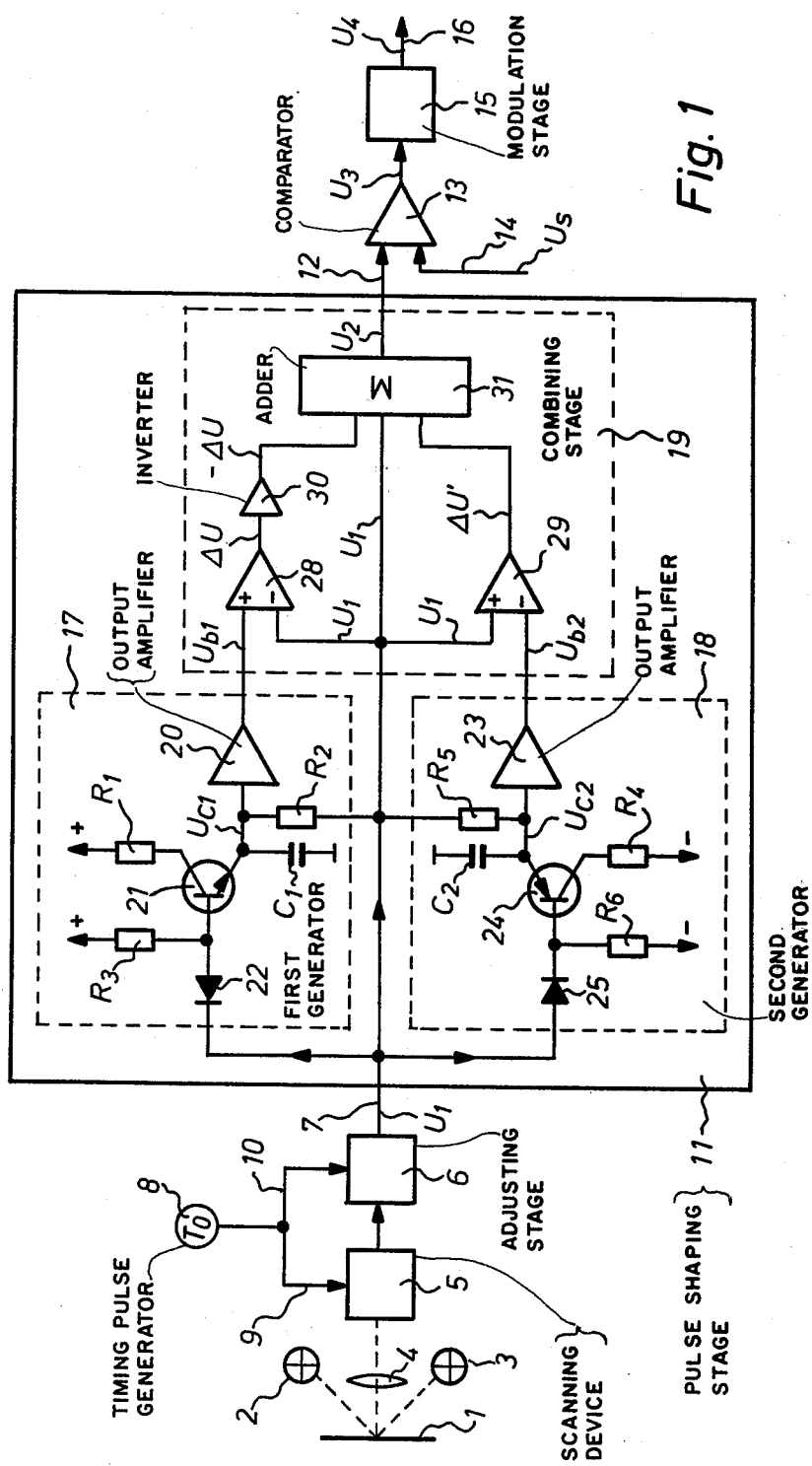
FIG. 1 is a basic circuit diagram of a facsimile scanning arrangement having a pulse-shaping stage.

Referring now to the drawings, FIG. 1 is a basic circuit diagram of a facsimile scanning arrangement. An original 1 to be copied is illuminated by two light sources 2 and 3 and the scanning light modulated by the brightness information on the original 1 passes by way of an objective 4 into a scanning device 5 and is converted therein into a video signal by means of optoelectronic transducers.

For example, an integrated line of photodiodes is employed which preferably extends over the entire scanning line of the original 1, so that at any given time a complete scanning line is scanned without relative movement between the original 1 and the scanning device 5 and only then is a step of advance to the next scanning line carried out.

Advancing arrangements are not shown, since they do not per se form a subject of the Application and are known in the state of the art.

The line of photodiodes supplies a video signal in pulse or stepped form which is amplified in an adjusting stage 6 connected at the output side of the scanning device 5 and if necessary, in the case of a signal curve in pulse form, is converted by means of a sample-and-hold circuit into a video signal $U_1$ of stepped form, which is available on the conductor 7 for further processing.

A scanning timing pulse sequence $T_o$ controls the scanning of the original 1, image point by image point, by the line of photodiodes and the signal conversion in the adjusting stage 6, an image point being associated with each timing pulse. The timing pulse sequence $T_o$ is produced in a timing pulse generator 8 connected via a conductor 9 to the scanning device 5 and via a conductor 10 to the adjusting stage 6.

When fine lines and strokes are scanned or in the case of details of low contrast in the original, the stepped video signal $U_1$ shows only small falsified signal amplitudes which are boosted in a pulse-shaping stage 11.

The boosted video signal $U_2$ on a conductor 12 is compared in a comparator 13 with a threshold signal $U_s$ on a conductor 14. The result of the comparison is the two-level monochrome signal $U_3$, which is supplied to a modulation stage 15.

Depending upon the application, an amplitude or frequency modulation takes place in the modulation stage 15. In addition, a two-level to three-level conversion may be carried out.

The modulated monochrome signal $U_4$ arrives on a transmission channel 16 at a facsimile receiver (not shown), the recording device of which produces the facsimile of the original.

The transmission channel is a line or a radio transmission path.

The threshold signal $U_s$ on the conductor 14 may be a value prescribed in a constant manner for the scanning time, but which is otherwise adjustable. This so-called "constant threshold" is mentioned, for example in the specification of U.S. Pat. No. 3,159,815.

In accordance with German Laid-open Pending Patent Application No. 11 71 464, the threshold signal $U_s$ may, however, also be generated as a so-called "sliding threshold", which is caused to follow up slowly when there are changes in the luminance of the background of the original, whereby varying white of the paper within the original 1 can be compensated automatically.

The method and the circuit arrangement for boosting the pulses of the discontinuous-value stepped video signal $U_1$ in the pulse-shaping stage 11 are described hereinafter in detail.

In a first step of the method, an upper accompanying signal $U_{b1}$ extending above the video signal and a lower accompanying signal $U_{b2}$ extending below the video signal are obtained from the video signal $U_1$ in the pulse-shaping stage 11.

In a second stage of the method, there takes place the continuous formation of differential values $\Delta U$ between the upper accompanying signal $U_{b1}$ and the video signal $U_1$ and of differential values $\Delta U'$ between the video signal $U_1$ and the lower accompanying signal $U_{b2}$.

In a third step of the method, for the purpose of boosting the pulses, the differential values $\Delta U$ are subtracted from the video signal $U_1$ and the differential values $\Delta U'$ are added to the video signal $U_1$.

Figure 2:
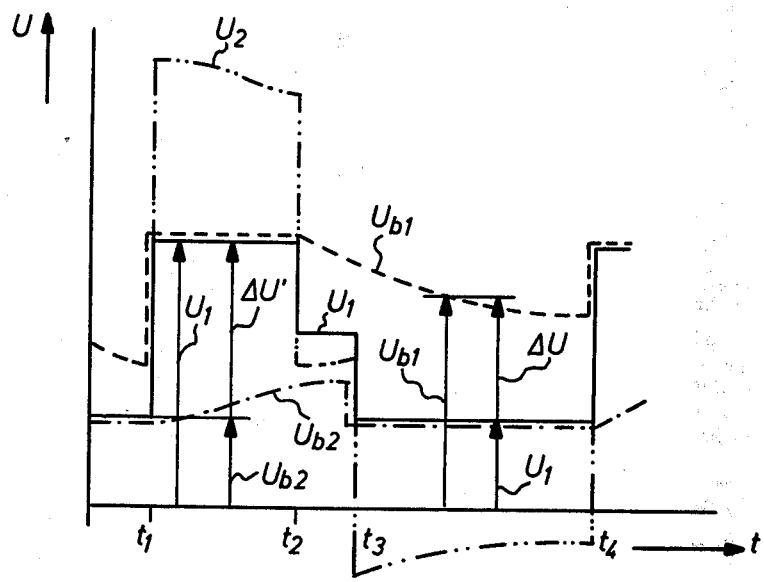
FIG. 2 is a graphic representation of the signals appearing in FIG. 1.

The signal curves produced in the process are shown in FIG. 2.

The pulse-shaping stage 11 consists of a first generator 17 to which the video signal $U_1$ is applied and for forming the upper accompanying signal $U_{b1}$, a second generator 18 for forming the lower accompanying signal $U_{b2}$, and a combining stage 19 for the signal $U_1$, $U_{b1}$ and $U_{b2}$. The boosted video signal $U_2$ appears at the output of the combining stage 19 and is supplied to the comparator 13.

The first generator 17 has a charging capacitor $C_1$ having a highly resistive output amplifier 20 connected at its output side.

The charging capacitor $C_1$ is charged via a transistor 21 and a resistor $R_1$ with a small time constant ($\tau_1 \approx C_1 \cdot R_1$) and is discharged via a resistor $R_2$ with a large time constant ($\tau_2 \approx C_1 \cdot R_2$) in response to the video signal $U_1$. The video signal $U_1$ on the conductor 7 controls the transistor 21 via a diode 22.

The time constant $\tau_2$ is chosen approximately equal to the scanning time for one to five image points. Advantageously it is equal to the scanning time for two image points.

The upper accompanying signal $U_{b1}$ corresponds to the voltage curve at the charging capacitor $C_1$ and at the output of the output amplifier 20.

The upper accompanying signal $U_{b1}$ is indicated in FIG. 2. With a rising video signal $U_1$, the transistor 21 is conducting and the capacitor $C_1$ is charged at any given time in response to the video signal $U_1$ with the time constant $\tau_1$, whereby the upper accompanying signal $U_{b1}$ follows the video signal $U_1$ in the space of time $t_1 - t_2$. With a decreasing video signal $U_1$ at the time $t_2$, the transistor 21 blocks ($U_{c1} > U_1$) and the charging capacitor $C_1$ discharges itself with the large time constant $\tau_2$ via the resistor $R_2$. The upper accompanying signal $U_{b1}$ now follows the video signal $U_1$ in accordance with an e-function unitl it has reached the video signal $U_1$ again at the time $t_4$ and discharge of the capacitor is prevented. The upper accompanying signal $U_{b1}$ then again follows the rise in the video signal.

The approximation of the upper accompanying signal $U_{b1}$ to the video signal $U_1$ may, of course, also take place in accordance with another function.

The second generator 18 likewise has a charging capacitor $C_2$ having another output amplifier 23 connected at its output side. The charging capacitor $C_2$ is charged via a transistor 24 and a resistor $R_4$ with a small time constant ($\tau_3 \approx C_2 \cdot R_4$) and is discharged with a large time constant ($\tau_4 \approx C_2 \cdot R_5$) via the resistor $R_5$ in response to the video signal $U_1$. The video signal $U_1$ controls the transistor 24 via a diode 25.

Preferably, $\tau_1$ is chosen equal to $\tau_3$ and $\tau_2$ equal to $\tau_4$. The discharge of the charging capacitors $C_1$ and $C_2$ may also take place in response to a fixed potential, for example the black value or the white value, instead of one the video signal. In this case, the time constants change accordingly.

In contrast to the generator 17, the polarity of the feed voltages and the diode 25 is reversed in the generator 18 and the transistor 24 is complementary. Since the mode of operation is similar to that of the first generator 17, further explanation is unnecessary.

The curve of the lower accompanying signal $U_{b2}$, which is likewise apparent from FIG. 2, corresponds to the curve of the voltage at the charging capacitor $C_2$ and at the output of the output amplifier 23.

In the combining stage 19, the first differential value $\Delta U$ between the upper accompanying signal $U_{b1}$ and the video signal $U_1$ is formed continuously in a differential amplifier 28 and the second differential value $\Delta U'$ between the video signal $U_1$ and the lower accompanying signal $U_{b2}$ is formed continuously in another differential amplifier 29.

The formation of the differences is indicated in FIG. 2 by means of the arrows entered therein.

The first differential value $\Delta U$ inverted in amplitude by means of an inverter 30, the second differential value $\Delta U'$ and the video signal $U_1$ are combined in an adder 31 to form the boosted video signal $U_2$ in accordance with the expression $$U_2 = U_1 - \Delta U + \Delta U' \tag{1}$$

The curve of the boosted video signal $U_2$ is likewise apparent from FIG. 2.

In the time interval $t_1-t_2$, $\Delta U=0$ and the differential value $\Delta U'$ is added to the video signal $U_1$. In the time interval $t_3-t_4$, on the other hand, the differential value $\Delta U'=0$ and the differential value $\Delta U$ is substracted from the video signal $U_1$. In the time interval $t_2-t_3$, both differential values are taken into account.

Figure 3:
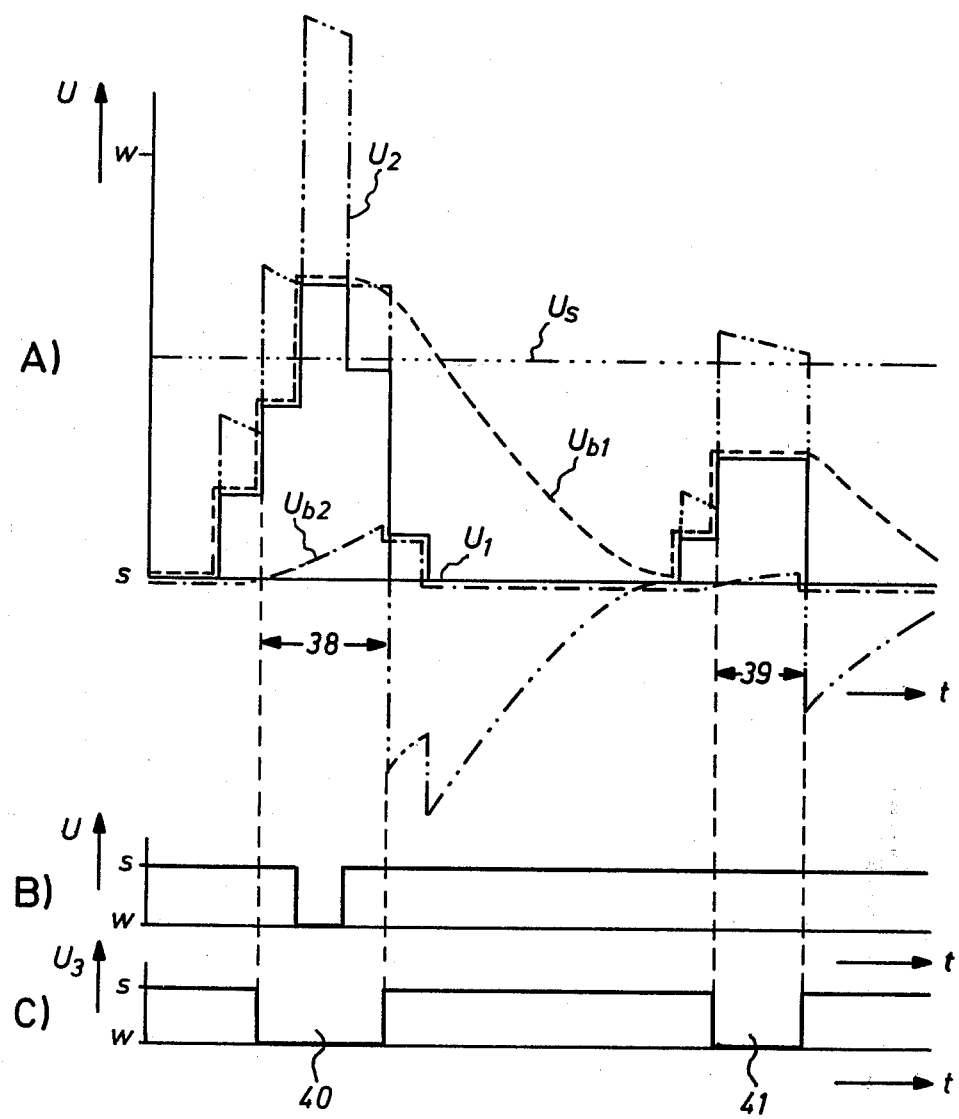
FIG. 3 is a graphic representation of the pulse boosting.

FIG. 3 illustrates with the aid of a graphic representation the way in which the boosting of the pulses acts.

(A) shows an arbitrary curve of the video signal $U_1$, the curves of the accompanying signals $U_{b1}$ and $U_{b2}$,—these curves being dependent on the video signal $U_1$—, the constant threshold signal $U_s$ and the boosted video signal $U_2$.

The time-discrete and stepped curve of the video signal $U_1$ may be produced, for example, by preparing the output signal of a line of photodiodes by means of a sample-and-hold circuit.

On scanning of a white image area of the original 1, large signal amplitudes are obtained, for a black image area small signal amplitudes are obtained and, in the case where thin strokes and lines are scanned, medium signal amplitudes are obtained.

For example, let a black area of an original with thin white lines (zones 38 and 39) be scanned.

Whereas the first pulse intersects the threshold signal $U_s$, the amplitude of the second pulse is below the threshold signal $U_s$, i.e. the second white line (zone 39) is lost. The associated curve of the two-level monochrome signal which would be obtained in this case is plotted in (B).

As a result of the pulse boosting, the second pulse now also intersects the threshold signal $U_s$, because of which both white lines are recognised and recorded. (C) shows the corresponding curve of the two-level monochrome signal $U_3$ at the output of the comparator 13 of FIG. 1.

Figure 4:
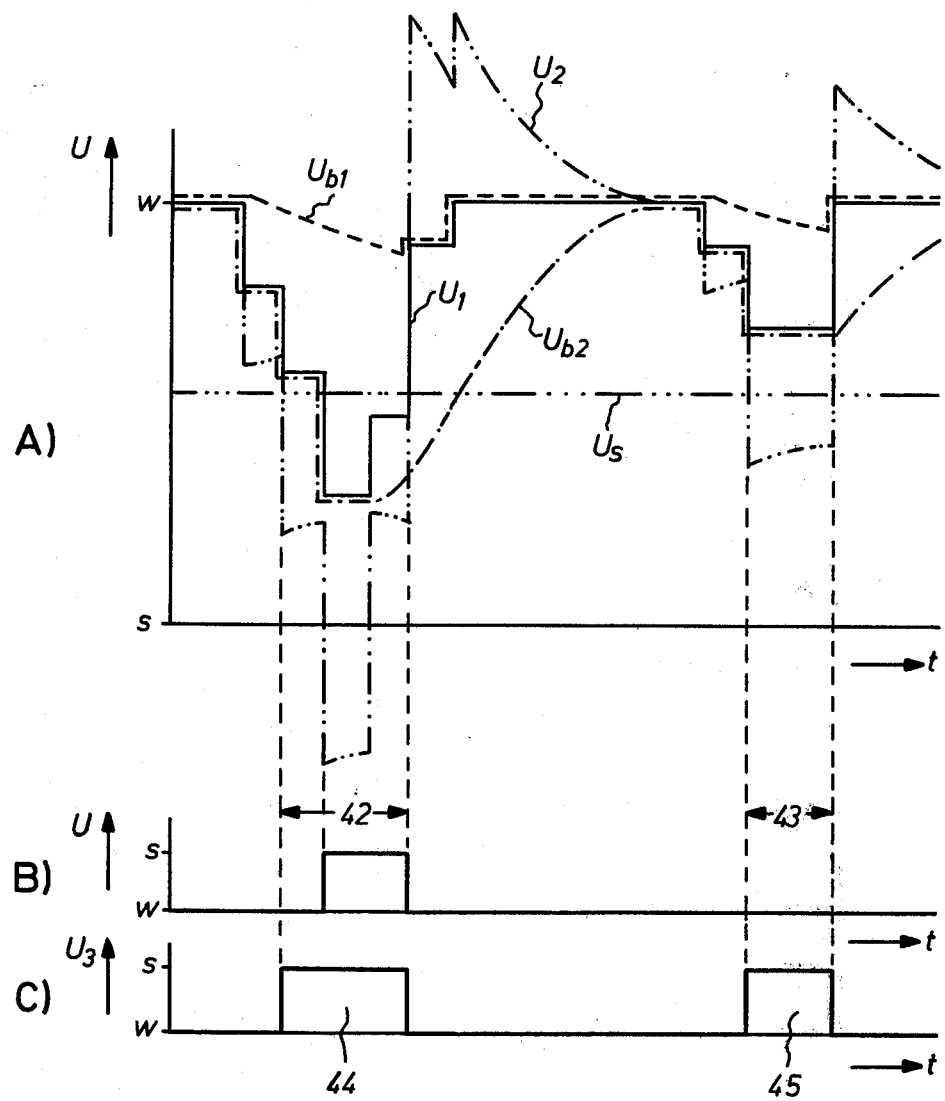
FIG. 4 is another graphic representation of the pulse boosting.

FIG. 4 is another graphic representation of the way in which the boosting of the pulses acts.

For example, let a white area of an original with thin black lines (zones 42 and 43) be scanned. Without boosting the pulses, the second pulse (zone 43) would again be lost, as is apparent from the signal curve (B).

By boosting the pulses, on the other hand, both black lines 44 and 45 are recognised and recorded. (C) again shows the curve of the two-level monochrome signal $U_3$ at the output of the comparator 13 of FIG. 1.

According to FIG. 1, the amplitude value ($\Delta U$; $\Delta U'$) is first obtained and combined with the video signal $U_1$ for boosting the amplitude. The video signal boosted in this way, the signal $U_2$, is then converted into the two-level monochrome signal $U_3$ by comparison with the threshold signal $U_s$ in the comparator 13.

The same effect can also be achieved, however, if the amplitude value obtained is combined with the threshold signal $U_s$ and the threshold signal modified in this way is compared with the unchanged video signal $U_1$.

The methods described, which are preferably employed for discontinuous-value signals, may of course also be used for boosting continuous-value signals.

Figure 5:
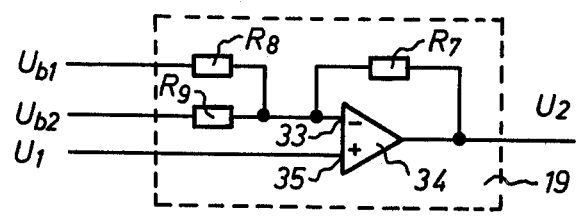
FIG. 5 shows an embodiment of a combining stage.

FIG. 5 shows a preferred embodiment of the combining stage 19. If the values $\Delta U=U_{b1}-U_1$ and $\Delta U'=U_1-U_{b2}$ are introduced into equation (1), the boosted video signal $U_2$ is obtained as:

$$U=3U_1-(U_{b1}+U_{b2}) \qquad (2)$$

The accompanying signals $U_{b1}$ and $U_{b2}$ are added up via the resistors $R_8$ and $R_9$ and the sum is applied to the inverting input 33 of the operational amplifier 34. The non-inverting input 35 of the operational amplifier 34 has the video signal $U_1$ applied to it. The factor "3" is established by the choice of the resistors and by the degree of amplification of the operational amplifier 34.

So far, the boosting of amplitude by a factor of one has been discussed, i.e. the amplitude of the video signal $U_1$ has been raised at the most to twice its value. Of course, multiple boosting of amplitude can also be carried out. In this case, the boosted video signal $U_2$ is obtained as:

$$U_2=U_1-m\cdot\Delta U+n\cdot\Delta U' \qquad (3)$$

The factors "m" and "n" correspond to the degree of amplification of the differential amplifiers 28 and 29 in FIG. 1.

The circuit shown in FIG. 5 for the combining stage 19 has the advantage that with like factors "m" and "n" only the resistor $R_7$ has to be varied.

I claim:

1. A method of boosting a video signal, which method consists in deriving from said video signal an upper accompanying signal extending above it and a lower accompanying signal extending below it, said accompanying signals following said video signal dynamically, forming first differential values continuously between said upper accompanying signal and said video signal, forming second differential values continously between said video signal and said lower accompanying signal, subtracting multiples of said first differential values continuously from said video signal and adding multiples of said second differential values continuously to said video signal.

2. A method according to claim 1, wherein said upper accompanying signal substantially follows the rising video signal to its maximum value, likewise decreases as said video signal decreases in accordance with a prescribed course, until said video signal and said upper accompanying signal coincide, and then again follows said rising video signal, and said lower accompanying signal substantially follows said decreasing video signal to its minimum value, likewise rises as said video signal rises in accordance with a prescribed course, until said vided signal and said lower accompanying signal coincide, and then again follows said decreasing video signal.

3. A method according to claims 1 or 2, wherein said accompanying signals are obtained by the charging and discharge, controlled by said video signal, of capacitors whose charging time constants are selected to be small and whose discharge time constants are selected to be large in each case, a first one of said capacitors is charged with one charging time constant in response to said video signal as it rises and is discharged with one discharge time constant as said video signal decreases, and a second one of said capacitors is charged with the other charging time constant in response to said video signal as it decreases and is discharged with the other discharge time constant as said video signal rises.

4. A method according to claim 3, wherein said capacitors discharge to the level of said video signal.

5. A method according to claim 3, wherein said capacitors discharge to the level of a fixed potential.

6. A method according to claim 3, wherein said discharge time constants are equal.

7. A method according to claim 3, wherein said video signal is obtained by scanning an original image-point by image-point and said discharge time constants are approximately equal to the scanning time for one to five image-points.

8. A method according to claim 3, wherein said video signal is obtained by scanning an original image-point by image-point and said discharge time constants are approximately equal to the scanning time for two image-points.

9. A circuit arrangement for boosting a video signal comprising an arrangement for obtaining said video signal, a first generator to which said video signal can be applied and for generating an upper accompanying signal extending above said video signal, a second generator to which said video signal can be applied and for generating a lower accompanying signal extending below said video signal, and a combining stage connected to said generators and to said arrangement for obtaining the boosted video signal by combining said accompanying signals with said video signal.

10. An assembly according to claim 9, wherein said combining stage comprises a first differential amplifier to which said upper accompanying signal and said video signal can be applied and with a following amplitude inverter for forming multiples of said first differential values, a second differential amplifier to which said lower accompanying signal and said video signal can be applied and for forming multiples of said second differential values, and an adding stage for forming the boosted video signal and which is connected to said amplitude inverter, said arrangement and said second differential amplifier.

* * * * *